US012755380B2

(12) United States Patent
Sousa Ferreira et al.

(10) Patent No.: US 12,755,380 B2
(45) Date of Patent: *Oct. 6, 2026

(54) AUTOMATIC DETECTION AND DIFFERENTIATION OF PANCREATIC CYSTIC LESIONS IN ENDOSCOPIC ULTRASONOGRAPHY

(71) Applicant: DIGESTAID—ARTIFICIAL INTELLIGENCE DEVELOPMENT, LDA, Gondomar (PT)

(72) Inventors: João Pedro Sousa Ferreira, Oporto (PT); Miguel José Da Quinta E Costa De Mascarenhas Saraiva, Oporto (PT); Manuel Guilherme Gonçalves De Macedo, Oporto (PT); Marco Paulo Lages Parente, Oporto (PT); Renato Manuel Natal Jorge, Oporto (PT); Filipe Manuel Vilas Boas Silva, Oporto (PT); Pedro Manuel Gonçalves Moutinho Ribeiro, Oporto (PT); Susana Isabel Oliveira Lopes, Oporto (PT); João Pedro Lima Afonso, Oporto (PT); Tiago Filipe Carneiro Ribeiro, Lordelo (PT)

(73) Assignee: Digestaid—Artificial Intelligence Development, LDA, Gondomar (PT)

( * ) Notice: Subject to any disclaimer, the term of this patent is extended or adjusted under 35 U.S.C. 154(b) by 265 days.

This patent is subject to a terminal disclaimer.

(21) Appl. No.: 18/682,332

(22) PCT Filed: Aug. 3, 2022

(86) PCT No.: PCT/PT2022/050023
§ 371 (c)(1),
(2) Date: Feb. 8, 2024

(87) PCT Pub. No.: WO2023/018343
PCT Pub. Date: Feb. 16, 2023

(65) Prior Publication Data

US 2024/0354949 A1 Oct. 24, 2024

(30) Foreign Application Priority Data

Aug. 9, 2021 (PT) ........................................ 117391

(51) Int. Cl.
*G06T 7/00* (2017.01)
*G06N 3/0464* (2023.01)

(52) U.S. Cl.
CPC ......... *G06T 7/0012* (2013.01); *G06N 3/0464* (2023.01); *G06T 2207/10068* (2013.01);
(Continued)

(58) Field of Classification Search
CPC ......... G06T 7/0012; G06T 2207/10068; G06T 2207/10132; G06T 2207/20081;
(Continued)

(56) References Cited

U.S. PATENT DOCUMENTS

2020/0226748 A1* 7/2020 Kaufman ............... G06N 3/082
2022/0138932 A1* 5/2022 Bonakdar Sakhi .... G16H 50/50
382/128

(Continued)

*Primary Examiner* — Bobbak Safaipour
(74) *Attorney, Agent, or Firm* — Heisler & Associates

(57) ABSTRACT

The present invention relates to a computer-implemented method capable of automatically detecting pancreatic cystic both mucinous and serous in endoscopic ultrasonography image/videos data, by classifying pixels as lesion or non-lesion, using a convolutional image feature extraction step followed by a classification step and indexing such lesions in the set of one or more classes.

26 Claims, 12 Drawing Sheets

(52) U.S. Cl.
CPC ............... *G06T 2207/10132* (2013.01); *G06T 2207/20081* (2013.01); *G06T 2207/20084* (2013.01)

(58) Field of Classification Search
CPC ........... G06T 2207/20084; G06T 2207/30004; G06N 3/0464; G06N 3/09; G06N 3/091; G06N 3/096; G06N 3/0985
See application file for complete search history.

(56) References Cited

U.S. PATENT DOCUMENTS

| | | | | |
|---|---|---|---|---|
| 2022/0189028 | A1* | 6/2022 | Yoo | G16H 50/50 |
| 2023/0410295 | A1* | 12/2023 | Sousa Ferreira | G06N 3/045 |
| 2024/0013377 | A1* | 1/2024 | Sousa Ferreira | A61B 1/041 |
| 2024/0233122 | A9* | 7/2024 | Sousa Ferreira | G06T 7/0012 |
| 2025/0360126 | A1* | 11/2025 | Shechter | A61K 31/7105 |

* cited by examiner

| Evaluation of method 9000 | Best overall accuracy (mean ± standard deviation in %) | |
|---|---|---|
| | with method 8000 (our method) | without method 8000 |
| VGG | 92.3 ± 4.7 | 83,4 |
| ResNet50 | 95.1 ± 4.2 | 86,5 |
| ResNet125 | 94.4 ± 3.4 | 89,3 |
| InceptionV3 | 92.9 ± 2.1 | 85,8 |
| MobileNet | 82.5 ± 1.2 | 74,7 |
| Xception | 96.4 ± 4.3 | 90,2 |
| EfficientNetB3 | 91.6 ± 3.2 | 83,9 |
| EfficientNetB5 | 93.8 ± 3.9 | 85,6 |
| EfficientNetB7 | 97.2 ± 5.1 | 92,3 |

FIG. 11

AUTOMATIC DETECTION AND DIFFERENTIATION OF PANCREATIC CYSTIC LESIONS IN ENDOSCOPIC ULTRASONOGRAPHY

BACKGROUND OF THE INVENTION

The present invention relates to the lesion detection and classification in medical image data. More particularly, to automated identification of pancreatic cystic lesions in images/videos acquired during endoscopic ultrasonography, also known as endoscopic ultrasound imagery, to assess the lesion seriousness and subsequent medical treatment.

Pancreatic cystic lesions (PCLs) are very common. A recent systematic review including 17 studies found a pooled prevalence of 8%.

PCLs are a wide variety of entities that include congenital, inflammatory, and neoplastic lesions. Patients with PCLs have an increased risk of pancreatic malignancy compared with the general population but malignancy occurs virtually only in those with mucinous structure. IPMN (intraductal papillary mucinous neoplasia) is the most common pancreatic cystic neoplasia and accounted for nearly half of pancreatic resections for cystic lesions at a reference academic hospital in the USA.

The diagnosis of PCLs based on Endoscopic ultrasound (EUS) is imperfect. In fact the accuracy to differentiate mucinous from non-mucinous lesion ranges from 48-94% with a sensitivity of 36-91%, and a specificity of 45-81%.

One of the limitations of EUS is the low interobserver agreement for the diagnosis of neoplastic versus nonneoplastic lesions and specific type of PCLs. This issue is still valid for different observer groups considered as experts, semiexperts, or novices.

To optimize the diagnosis based on EUS morphology and minimize the reduced interobserver agreement, our group devoloped CNN (convolutional neural network) algorithm for mucinous and serous cyst diagnosis using EUS images.

Image analysis using Machine Learning uses Convolutional Neural Networks to extract image features, which might resemble a category of interest.

Medical image visualization software allows clinicians to measure and report functional or anatomical characteristics on the medical image regions. Acquisition, processing, analysis, and medical image data storage play an essential role in diagnosing and treating patients. A medical imaging workflow and devices involved are configured, monitored, and updated throughout the operation of the medical imaging workflow and tools. Machine learning can help configure, monitor, and update the medical imaging workflow and devices.

Machine learning techniques can be used to classify an image. Deep learning uses algorithms to model high-level abstractions in data using a deep graph with multiple processing. Using a multilayered architecture, machines employing deep learning techniques process raw data to find groups of highly correlated values or distinctive themes.

Document WO2020176124 (A1) shows a bubble area identifier trained by a convolutional neural network. Although it uses similar a learning method, it does not classify or detect pancreatic cystic lesions.

Document WO2020195807 (A1) discloses a system to generate and display images of the gastrointestinal tract from capsule endoscopy. The invention does not apply any specific method of artificial intelligence for image classification. The invention provides a platform to deploy methods applied on images. It does not apply convolutional neural networks for image classification.

Document WO2021036863 (A1) presents a method for detection similar images and image classification from video capsule endoscopy. The invention does not apply optimized training sessions for image classification. The method of the invention does not detect or differentiates pancreatic cystic lesions.

Nguon et. Al [1] disclosed a machine learning method to differentiate mucinous cystic neoplasm and serous cystic neoplasm in the pancreas from endoscopic ultrasonography based on a convolutional neural network model using ResNet50. However, the method failed to disclose single patient k-fold clustering nor transfer learning for optimizing training metrics and classification accuracy.

Multiple deep learning approaches to classification or segmentation of medical abdominal images were disclosed by Rehman et al. [2]. Features are extracted from the images using different convolutional architectures, namely adapted for Pancreas computed tomography imaging. The document does not include any approach directed towards the differentiation of pancreatic cystic lesions.

Gamage et al. [3] presented a convolutional neural network for anomalies classification in the gastrointestinal tract using endoscopy images. The document discloses the usage of different network architectures and achieves remarkable accuracy in predicting eight-class anomalies. Regardless, such approach is not specific to pancreatic cystic lesions classification nor presents an optimized architecture selection.

BRIEF SUMMARY OF THE INVENTION

The present invention provides a method for deep learning based detection and differentiating of pancreatic cystic lesions, both mucinous and serous/non-mucinous in endoscopic ultrasonography images/videos. The determination of pancreatic cystic lesions nature is critical to evaluate pancreatic neoplasia potential. The automatic identification of lesions, both mucinous and serous/non-mucinous pancreatic cystic lesions, is therefore crucial for diagnosis and treatment planning.

By using trained convolutional layers of different architecture on the ImageNet1 dataset and further testing them using sample of the endoscopic ultrasound image stack, the potential to detect pancreatic lesions is shown. The disruptive clinical nature of the present invention is justified by the artificial intelligence system's ability to detect pleomorphic pancreatic cystic lesions, therefore assessing pancreatic neoplastic potential. Indeed, this novel neural network AI based approach, capable to automatically identify and differentiate pancreatic cystic lesions of subtle pleomorphic nature, is of the utmost importance in clinical practice, allowing a profitable pancreatic endoscopic ultrasonography diagnosis. Furthermore, the specific application of a tailor-made artificial intelligence system to pancreatic endoscopic ultrasonography is a relevant novelty introduced by this invention to the current state of the art. One of the most critical and frequent indications for performing pancreatic endoscopic ultrasonography is neoplastic pancreatic disease. Correct assessment of cystic lesions in the endoscopic ultrasonography findings is vital for clinical follow-up management. Therefore, by accurately identifying and differentiating cystic lesions in pancreatic endoscopic ultrasonography, the present invention helps the clinical team better define the diagnostic and therapeutic management of the patient, which may translate into optimized clinical outcomes.

The following were considered relevant to highlight the problem solved by the present invention from the methods known in the art to detect and classify cystic lesions in pancreatic endoscopic ultrasonography.

In one embodiment of the method detects relevant cystic lesions in pancreatic endoscopic ultrasonography images/videos. Cystic lesions identification in pancreatic endoscopic ultrasonography is vital to assess neoplastic pancreatic probability. Furthermore the invention uses transfer learning and semi-active learning. Transfer learning allows feature extraction and high-accuracy classification using reasonable datasets sizes. The semi-active implementation allows a continuous improvement in the classification system. A system such as this can embark a multitude of categories with clinical relevance. Furthermore, the invention preferably uses transfer learning for feature extraction of endoscopy ultrasonography images with overall accuracy >90% and employs a semi-active learning strategy for endoscopic ultrasonography images.

Another embodiment of the method splits the dataset into a number of stratified folds, where images relative to a given patient are included in one-fold only. Further, additionally or alternatively, such data is trained and validated with patient grouping to a random fold, i.e., images from an arbitrary patient belong to either the training or the validation set.

Preferred is a method which uses the chosen training and validation sets to further train a series of network architectures, which include, among others, a feature extraction, and a classification component. The series of convolutional neural networks to train include but are not limited to: VGG16, InceptionV3, Xception EfficientNetB5, EfficientNetB7, Resnet50, and Resnet125. Preferably, their weights are frozen, with exception to the BatchNormalization layers, and are coupled with a classification component. The classification component comprises at least two dense layers, preferably of sizes 2048 and 1024, and at least one dropout layer of preferably 0.1 in between them.

Alternatively, but not preferentially, the classification component can be used with more dense layers or with dense layers of different size. Alternatively, but not preferentially, the classification component can also be used without dropout layers.

Further, additionally, and preferably, the best performing architecture is chosen according to the overall accuracy and sensitivity. Performance metrics include but are not limited to f1-metrics. Further, the method is not limited to two to four dense layers in sequence, starting with 4096 and decreasing in half up to 512. Between the final two layers there is a dropout layer of 0.1 drop rate.

Lastly, the best performing solution is trained using the complete dataset with patient grouping.

Further embodiments of the present invention may include similar classification networks, training weights and hyperparameters.

These may include the usage of any image classification network, new or not yet designed.

In general, the method includes two modules: prediction and output collector. Prediction reads videos and flags images with findings. Conversely, the output collector passes these images with findings for processing.

Examples of advantageous effects of the present invention include: training using parameters from machine learning results of cloud-based every-day increasing datasets; automatically prediction of the endoscopic ultrasonography image by using a deep learning method so that the cystic lesions from image input of the pancreatic endoscopic ultrasonography can be identified and classified into mucinous and serous/non-mucinous, the usage of transfer learning improves the image classification speed and corresponding classification accuracy.

BRIEF DESCRIPTION OF THE DRAWINGS

FIG. 11 illustrates a result of performing deep learning-based lesion classification on the data volume 240 and 250, according to an embodiment of the present invention.

DETAILED DESCRIPTION

Figure 1:
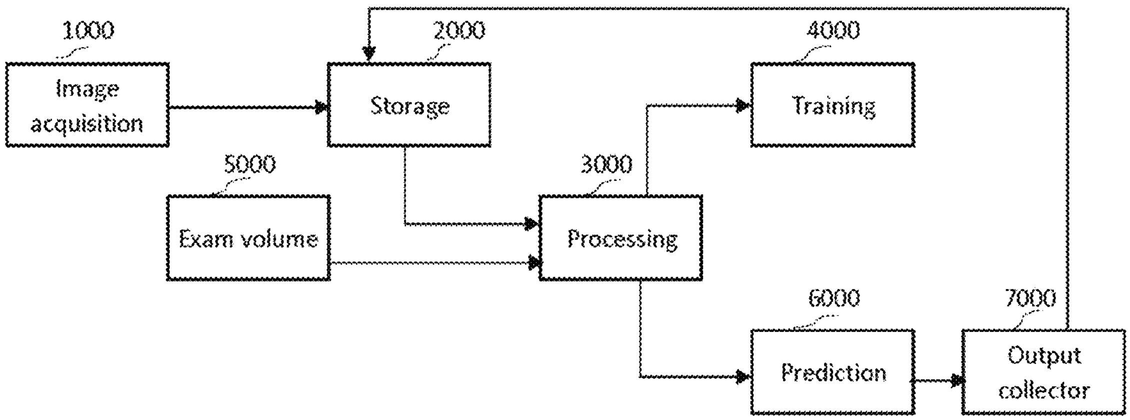
FIG. 1 illustrates a method for detection of cystic lesions in pancreatic endoscopic ultrasonography according to an embodiment of the present invention.

The present invention discloses a new method capable of identify and differentiate pancreatic cystic lesions classifying in images/videos acquired during a pancreatic endoscopic ultrasonography exam.

Some preferable embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

The term "deep learning" is a machine learning technique that uses multiple data processing layers to classify the data sets with high accuracy. It can be a training network (model or device) that learns based on a plurality of inputs and outputs. A deep learning network can be a deployed network (model or device) generated from the training network and provides an output response to an input.

The term "supervised learning" is a deep learning training method in which the machine is provided with already classified data from human sources. In supervised learning, features are learned via labeled input.

The term "convolutional neural networks" or "CNNs" are networks that interconnect data used in deep learning to recognize objects and regions in datasets. CNNs evaluate raw data in a series of stages to assess learned features.

The term "transfer learning" is a machine storing the information learned when attempting to solve one problem to solve another problem of similar nature as the first.

The term "semi-active learning" is used as a process of machine learning. Before executing the next learning process, the training network appends a set of labeled data to the training dataset from a trusted external entity. For example, as a machine collects more samples from specialized staff steps, the less prone it is to mispredict images of identical characteristics.

The term "computer-aided diagnosis" refers to machines that analyze medical images to suggest a possible diagnosis.

The term "pancreatic cystic lesions" refers to a biologically diverse group of lesions that have varying degrees of malignant potential. "Pancreatic cystic lesions" include a wide range of entities, namely congenital, inflammatory, and neoplastic lesions.

The term "mucinous cystic lesions" refers to pancreatic cystic lesions which cytology revealed mucinous epithelial cells or, in their absence, CEA fluid levels superior to 192 ng/mL and glucose levels inferior to 50 mg/dL. Pancreatic mucinous cystic lesions have a clinical malignancy/neoplastic potential.

The term "non-mucinous cystic lesions" refers to pancreatic cystic lesions which do not meet the above following criteria.

Non-mucinous lesions are pleomorphic pancreatic cystic lesions, mainly comprising serous pancreatic cystic lesions.

The term "serous cystic lesions" refers to pancreatic cystic lesions that constitute benign lesions composed of numerous small cysts that are arrayed in a honeycomb-like formation.

The present invention relates to a method for deep learning based method for detection and differentiation of mucinous and serous pancreatic cysts lesions in endoscopic ultrasonography images/video (FIG. 1). Often, embodiments of the present invention provide a visual understanding of the deep learning cysts lesions detection method. Automatic lesion classification of pancreatic images/videos in endoscopic ultrasonography is a challenging task. Although the automatic training and classification times is fast (on average 10 seconds for a test dataset of 2000 images), the output is not satisfactory for a fast diagnosis by the experts.

A method is described for pancreatic cysts lesions classification in endoscopic ultrasonography according to an embodiment of the present invention. The method comprises an image acquisition module, a storage module, a training input module, a processing module, an exam input module, a prediction module, an output collector module and a display module.

Figure 4:
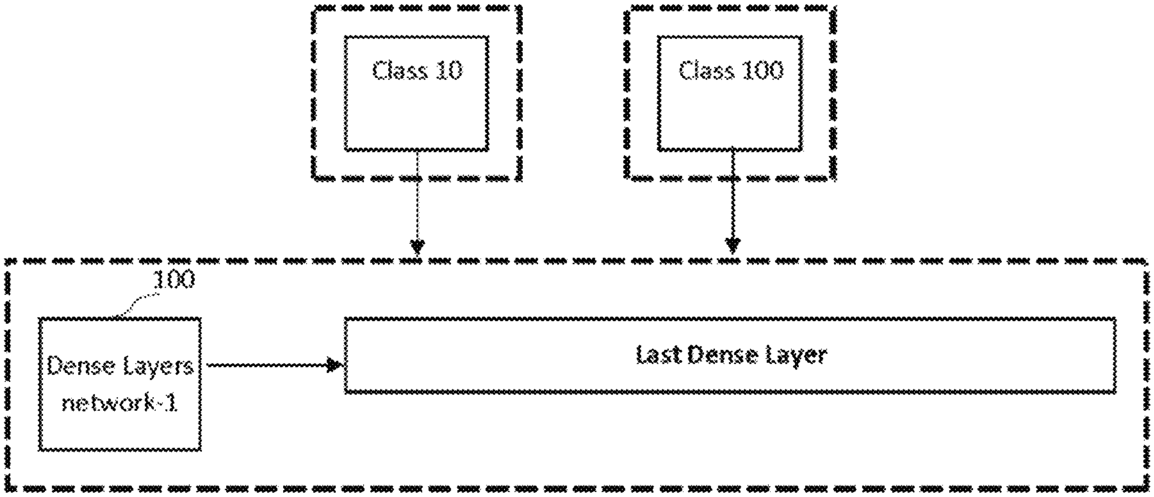
FIG. 4 illustrates the structure of the classification network for cystic lesions.

The image acquisition module 1000 receives exam input volumes from pancreatic endoscopic ultrasonography providers. Images and corresponding labels are loaded onto the storage module 2000. The storage module 2000 includes a multitude of classification network architectures 100, trained convolutional network architectures 110 and hyperparameters for training. The storage module 2000 can be a local or cloud server. The storage module contains training input labelled data from endoscopic ultrasound imagery and the required metadata to run processing module 3000, training module 4000, prediction module 5000, a second prediction module 6000, output collector module 7000. The input labelled data includes, but not only, images and corresponding lesion classification. The metadata includes, but not only, a multitude of classification networks architectures 100 exemplified in FIG. 4, a multitude of trained convolutional neural networks architectures 110, training hyperparameters, training metrics, fully trained models, and selected fully trained models.

Images 1000 and labelled data are processed at the processing module 3000 before running the optimized training at the training module 4000. The processing module normalizes the images according to the deep model architecture, to be trained at 3000 or evaluated at 4000. By manual or scheduled request, the processing module normalizes the image data at the storage module 2000 according to the deep model architectures that will run at training module 4000. Additionally, the processing module generates the data pointers to the storage module 2000 to form the partial or full images and ground-truth labels required to run the training module 3000. To prepare each training session, a dataset is divided folds, where patient-specific imagery is exclusive to one and one fold only, for training and testing. The training set is split for model training to generate the data pointers of the all images and ground-truth labels, required to run the training process 9000. K-fold is applied with stratified grouping by patient in the training set to generate the data pointers of the partial images and ground-truth labels, required to run the model verification process 8000 of the training module 4000. The split ratios and number of folds are available at the metadata of the storage module. Operators include but are not limited to users, a convolutional neural network trained to optimize the k-fold or a mere computational routine. Merely as an example, the dataset is divided with patient split into 90% for training and 10% for testing. Optionally, images selected for training can be split into 80% for training and 20% for validation during training. A 5-fold with stratified grouping by patient is applied in the images selected for training. By manual or scheduled request, the processing module normalizes the exam volume data 5000 according to the deep model architecture to run at the prediction module 6000.

Figure 2:
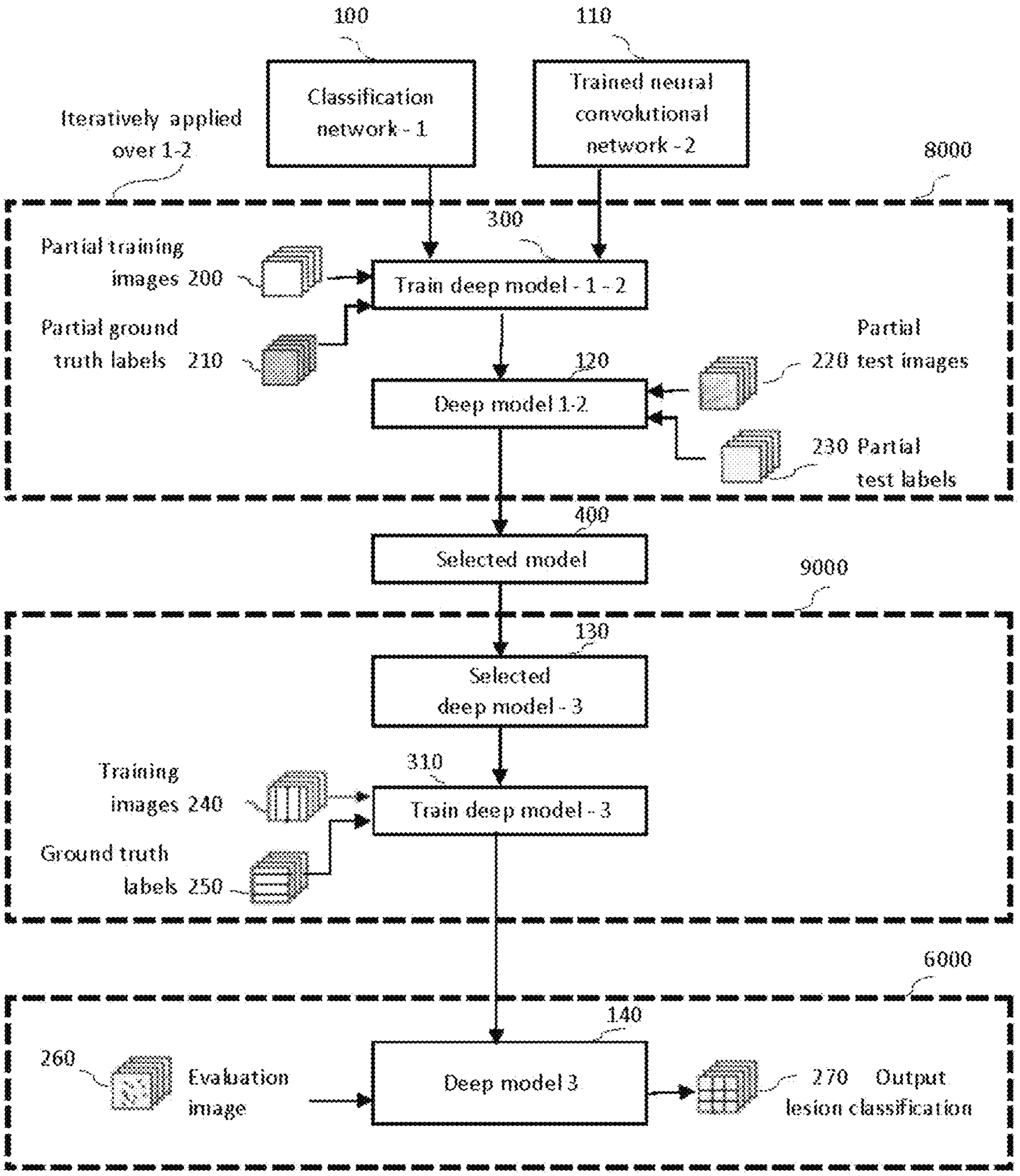
FIG. 2 illustrates the method for automatic detection and differentiation of cystic lesions in pancreatic endoscopic ultrasonography.
Figure 3:
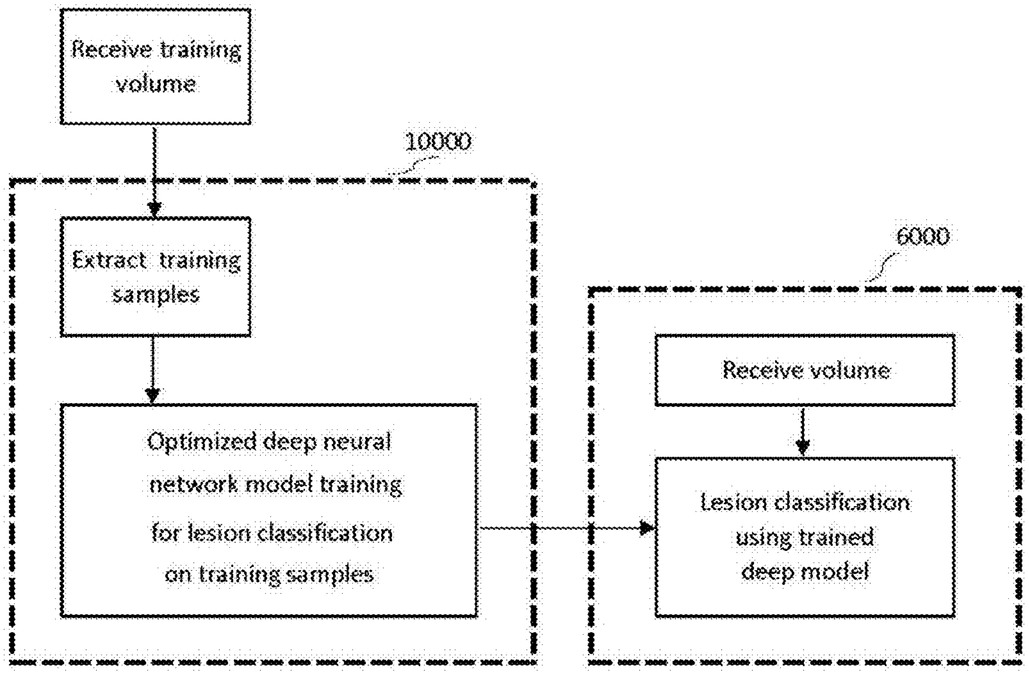
FIG. 3 illustrates the major processes for automatic detection and differentiation of cystic lesions in pancreatic endoscopic ultrasonography.

As seen in FIG. 2, the training module 4000 has a model verification process 8000, a model selection step 400 and a model training step 9000. The model verification part iteratively selects combinations of classification architectures 100 and convolutional networks 110 to train a deep model for pancreatic cystic lesion classification. The classification network 100 has Dense and Dropout layers to classify pancreatic cystic lesions according to their neoplastic potential. A neural convolutional network 110 trained on large datasets is coupled to the said classification network 100 to train a deep model 300. Partial training images 200 and ground-truth labels 210 train the said deep model 300. The performance metrics of the trained deep model 120 are calculated using a plurality of partial training images 220 and ground-truth labels 230. The model selection step 400 is based on the calculated performance metrics, such as f-1. The model training part 9000 trains the selected deep model architecture 130, at process 310, using the entire data of training images 240 and ground-truth labels 250. At the prediction module 6000, the trained deep model 140 outputs pancreatic cystic lesion classification 270 from a given evaluation image 260. An exam volume of data 5000 comprising the images from the endoscopic ultrasound imagery is the input of the prediction module 6000. The prediction module 6000 classifies image volumes of the exam volume 5000 using the best-performed trained deep model from 4000 (see FIG. 3). An output collector module 7000 receives the classified volumes and load them to the storage module after validation by another neural network or any other computational system adapted to perform the validation task.

Merely as exemplificative, the invention comprises a server containing training results for architectures in which training results from large cloud-based large datasets such as, but not only, ImageNet, ILSVRC, and JFT. The architecture variants include, but are not limited to, VGG, ResNet, Inception, Xception or Mobile, EfficientNets. All data and metadata can be stored in a cloud-based solution or on a local computer. Embodiments of the present invention also provide various approaches to make a faster deep model selection. FIG. 2 illustrates a method for deep learning pancreatic cystic lesion classification according to an embodiment of the present invention. The method of FIG. 2 includes a pretraining stage 8000, a training stage 9000. The training stage 8000 is performed with early stopping on small subsets of data to select the best-performed deep neural network for pancreatic cystic lesion classification among multiple combinations of convolution and classification parts. For example, a classification network of two dense layers of size 512 is coupled with the Xception model to train on a random set resulting from k-fold cross validation with patient grouping. Another random set is selected as the test set.

The process of training 8000 with early stopping and testing on random subsets is repeated in an optimization loop for combinations of (i) classification and transfer-learned deep neural networks; (ii) training hyperparameters. The image feature extraction component of the deep neural network is any architecture variant without the top layers accessible from the storage module. The layers of the feature extraction component remain frozen but are accessible at the time of training via the mentioned storage module. The BatchNormalization layers of the feature extraction component are unfrozen, so the system efficiently trains with endoscopic ultrasound imagery presenting distinct features from the cloud images. The classification component has at least two blocks, each having, among others, a Dense layer followed by a Dropout layer. The final block of the classification component has a BatchNormalization layer followed by a Dense layer with the depth size equal to the number of lesions type one wants to classify.

The fitness of the optimization procedure is computed to (i) guarantee a minimum accuracy and sensitivity at all classes, defined by a threshold; (ii) minimize differences between training, validation, and test losses; (iii) maximize learning on the last convolutional layer. For example, if a training shows evidence of overfitting, a combination of a shallow model is selected for evaluation.

The training stage 9000 is applied on the best performed deep neural network using the whole dataset.

The fully trained deep model 140 can be deployed onto the prediction module 6000. Each evaluation image 260 is then classified to output a lesion classification 270. The output collector module has means of communication to other systems to perform expert validation and confirmation on newly predict data volumes reaching 270. Such means of communication include a display module for user input, a thoroughly trained neural network for decision making or any computational programmable process to execute such task. Validated classifications are loaded on the storage module to become part of the datasets needed to run the pipelines 8000 and 9000, either by manual or schedule requests.

Figure 5:
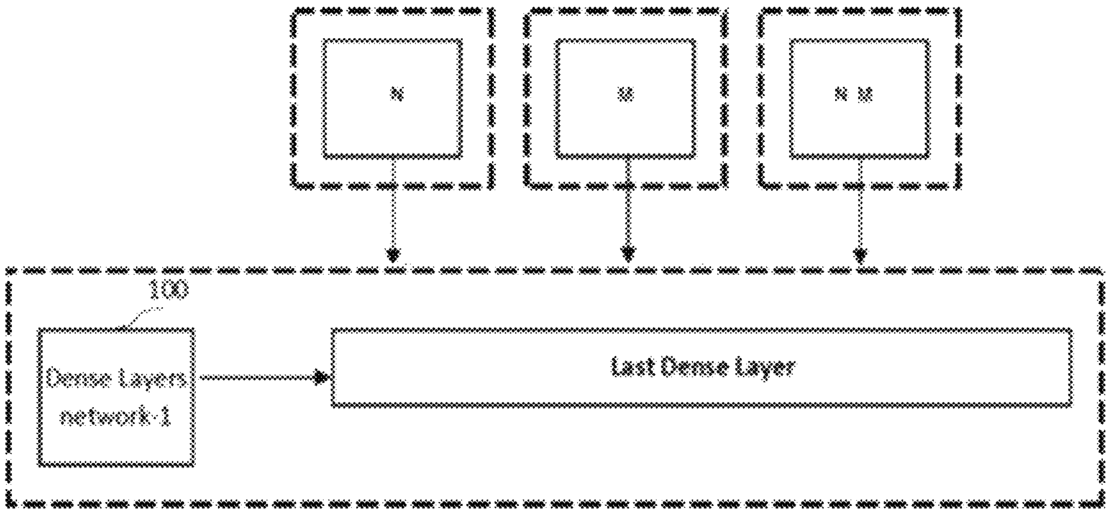
FIG. 5 depicts an embodiment of the classification network to classify cystic lesions, where in N there is no lesion; in M there is mucinous pancreatic cystic lesion and in NM there is a non-mucinous pancreatic cystic lesion.
Figure 6:
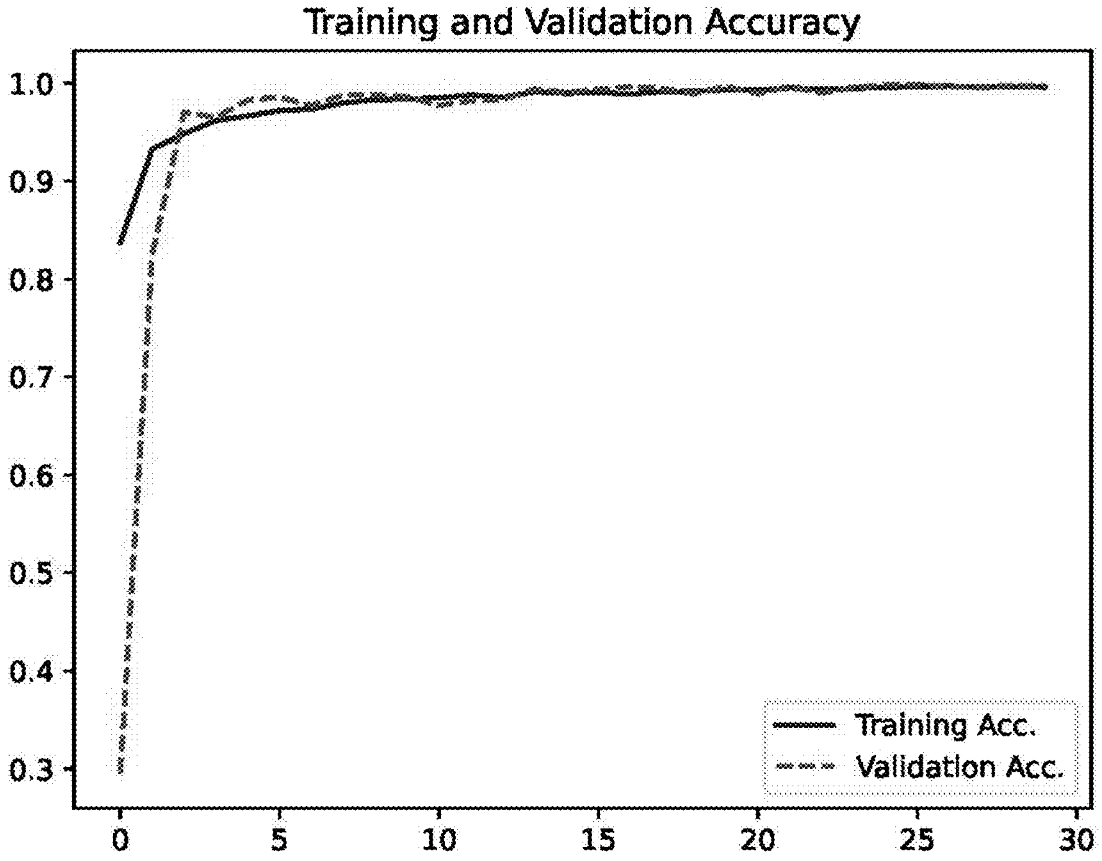
FIG. 6 illustrates a preferable embodiment of the present invention where the accuracy curves for the training on a small subset of images and labelled data are shown. Example of results from an iteration of method 8000.
Figure 7:
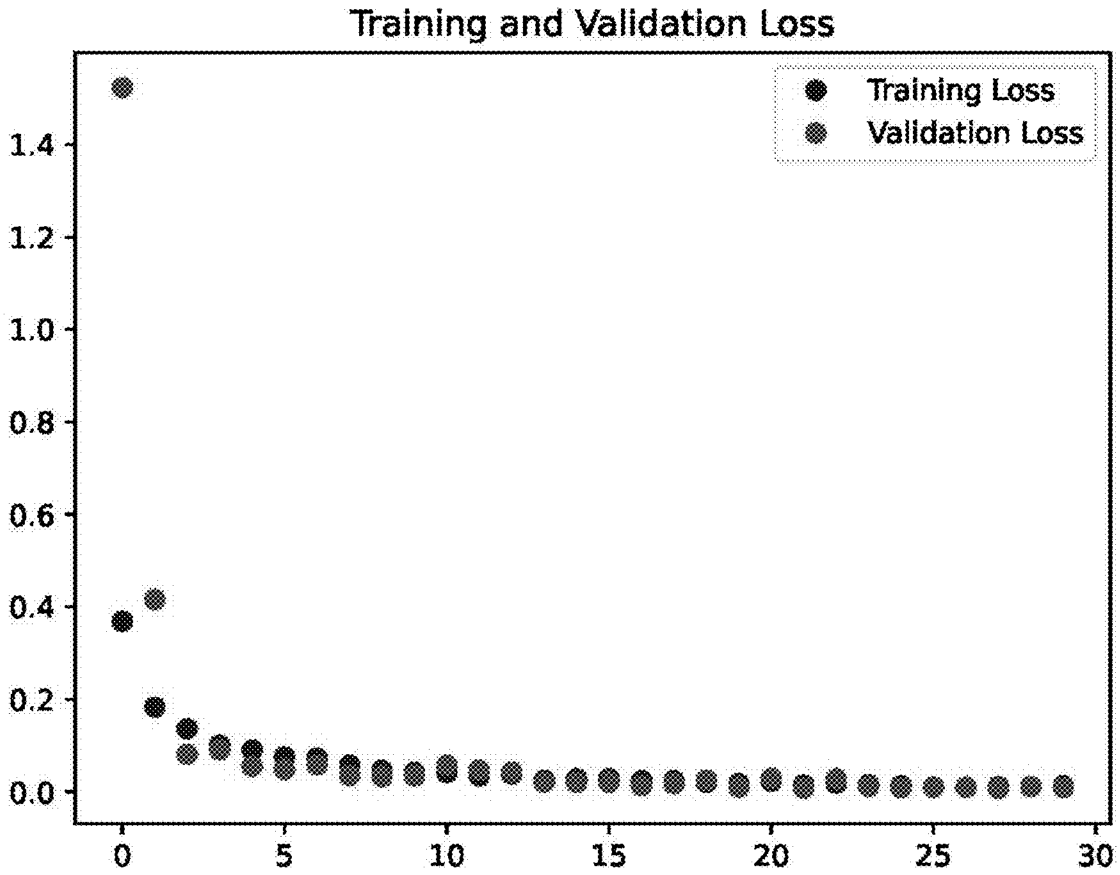
FIG. 7 illustrates exemplary accuracy curves during training on a small subset of images and labelled data and according to an embodiment of the present invention. Example of results from an iteration of method 8000.

An embodiment of the classification network 100, as seen in FIG. 5, can classify according to the pancreatic cystic lesion nature as N: Non lesion; M: Mucinous; NM: Non-mucinous; are shown and grouped accordingly. At a given iteration of method 8000 (FIGS. 7, 8, and 9), the optimization pipeline described herein uses accuracy curves, ROC curves and AUC values, and confusion matrix from training on a small subset of images and labeled data.

Figure 8:
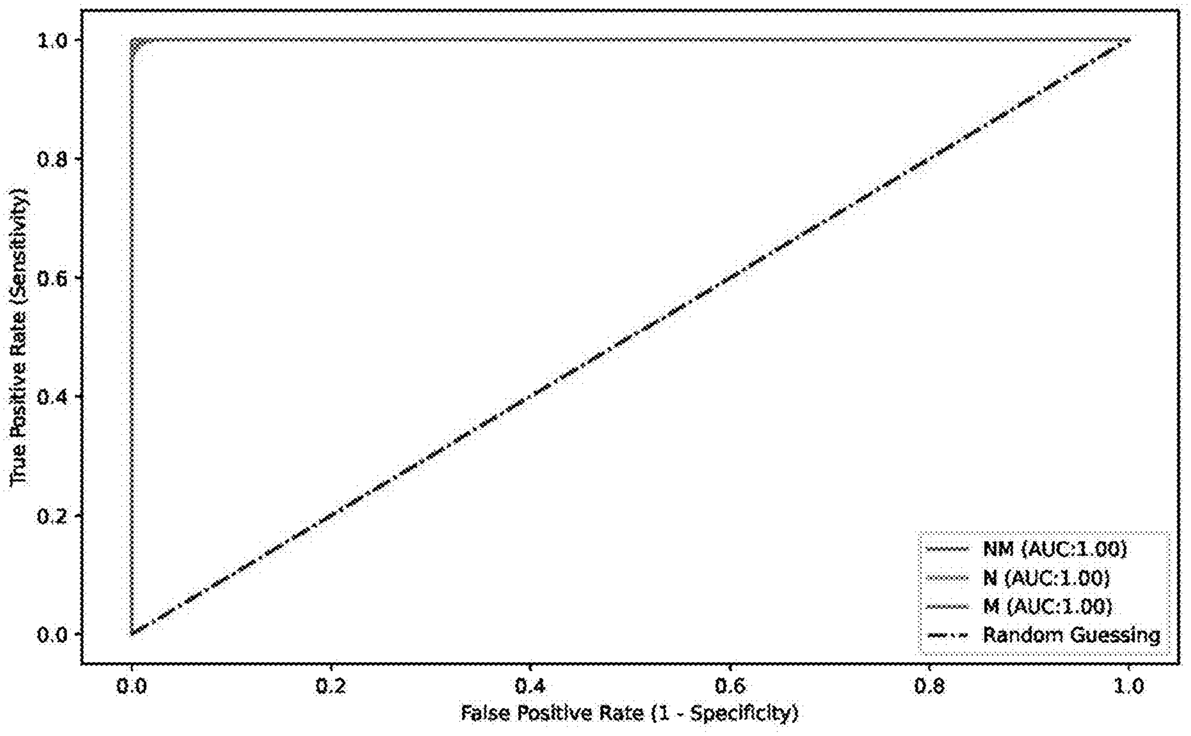
FIG. 8 illustrates exemplary ROC curves and AUC values obtained after training on a small subset of images and labelled data according to an embodiment of the present invention. Results used for model selection. Example of results from an iteration of method 8000.

FIG. 8 illustrates exemplary ROC curves and AUC values obtained after training on a small subset of images and labelled data where 10 (N-AUC: 1,00) 11 (M-AUC: 1,00), 12 (NM-AUC: 1,00), and 13 represent the Random Guessing.

Figure 9:
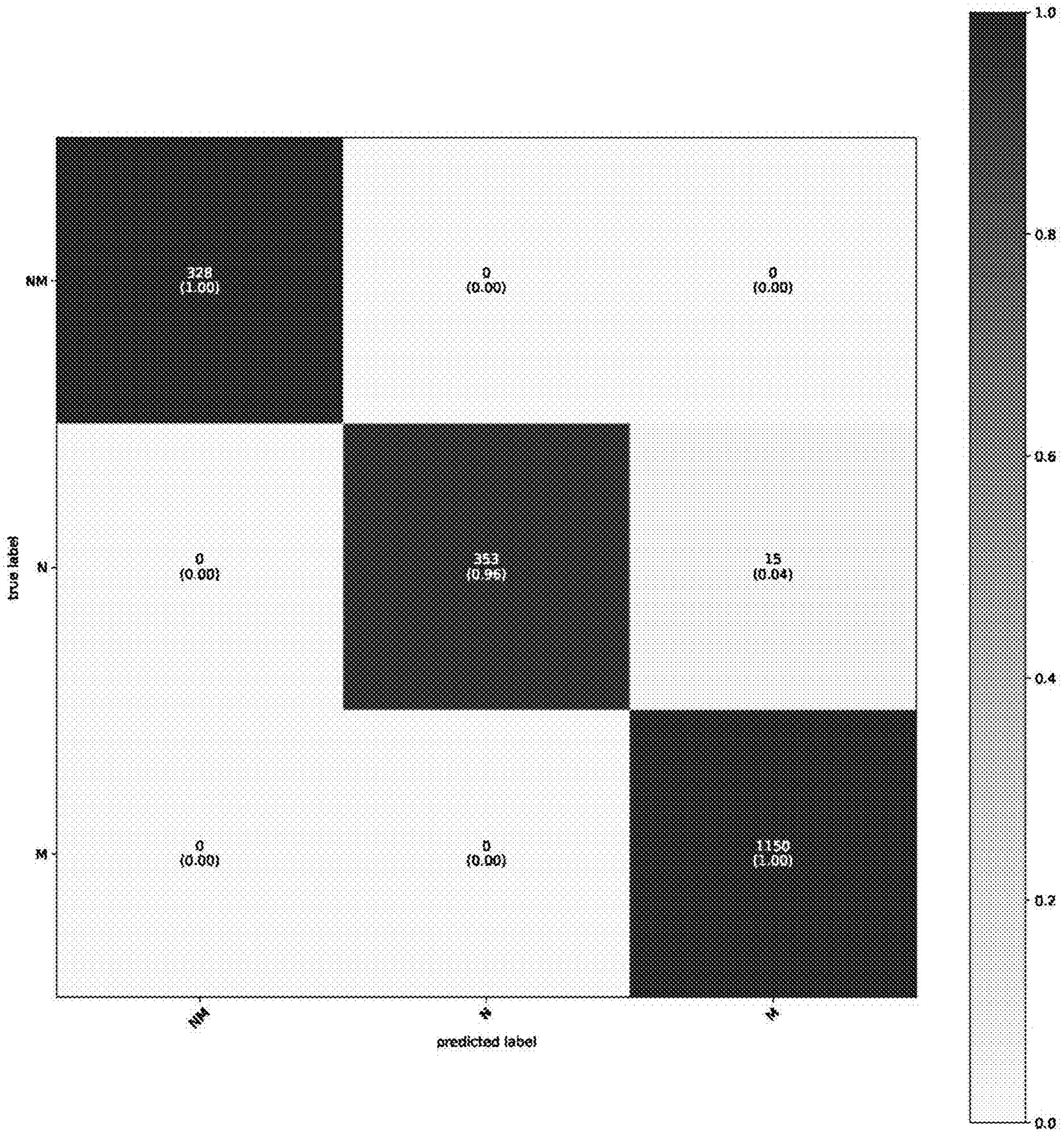
FIG. 9 illustrates an exemplary confusion matrix after training on a small subset of images and labelled data according to an embodiment of the present invention. Results used for model selection. Number of images of the small subset of data and respective class proportion between parentheses.

FIG. 9 illustrates an exemplary confusion matrix after training on a small subset of images and labelled data. Results used for model selection. Number of images of the small subset of data and respective class proportion between parentheses.

Figure 10:
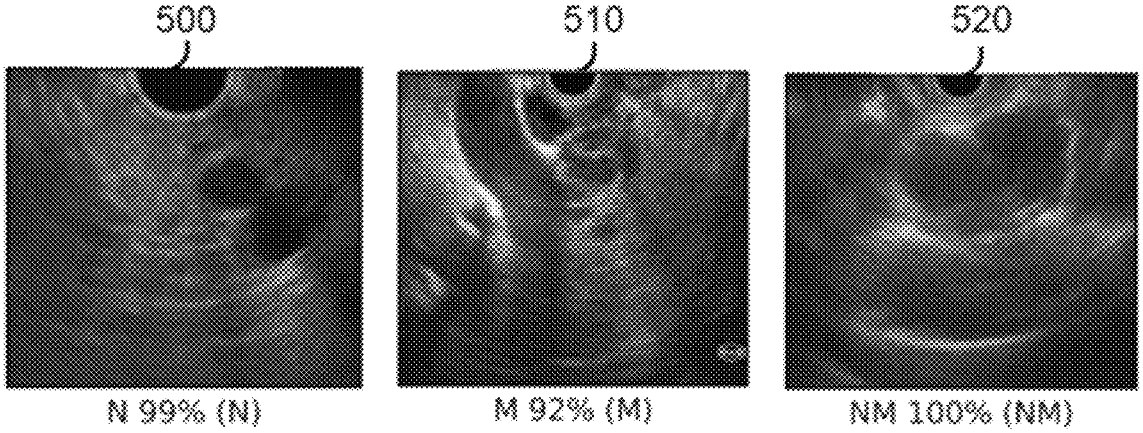
FIG. 10 illustrates examples of lesion classification according to an embodiment of the present invention.

FIG. 10 shows examples of lesion classification according to an embodiment of the present invention, where in 500 there is no lesion; in 510 there is mucinous pancreatic cystic lesion and in 520 there is a non-mucinous pancreatic cystic lesion.

FIG. 11 shows a result of performing deep learning-based lesion classification on the data volume 240 and 250, according to an embodiment of the present invention. The results of pancreatic cystic classification using the training method 8000 of the present invention are significantly improved as compared to the results using the existing methods (without method 8000).

Figure 12:
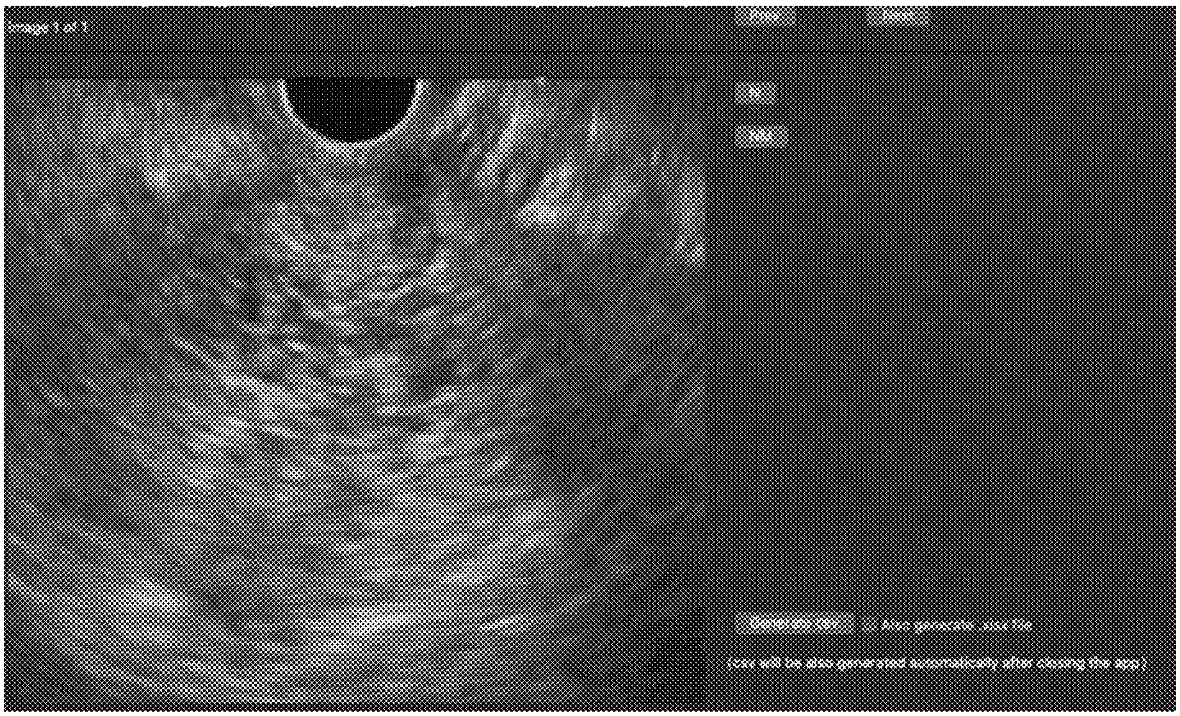
FIG. 12 illustrates an example of a classified lesion waiting for expert confirmation.

FIG. 12 shows an example of a classified lesion waiting for validation by the output collector module 7000. By another neural network or any other computational system adapted to perform the validation task, physician expert in endoscopic ultrasound imagery identifies pancreatic cystic lesions, analyzing the labelled image classified by the deep model 140. Options for image reclassification on the last layer of the classification network 100 are depicted in FIG. 5. Optionally, confirmation or reclassification are sent to the storage module.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art within the scope of the appended claims.

References

[1] Nguon et al.: "Deep Learning-Based Differentiation between Mucinous Cystic Neoplasm and Serous Cystic Neoplasm in the Pancreas Using Endoscopic Ultrasonography", Diagnostics, vol. 11, no. 6, 8 Jun. 2021.

[2] Rehman et al.: "A deep learning based review on abdominal images", Multimedia Tools and Applications, Kluwer Academic Publishers, Boston, US, vol. 80, no.20, 3 Sep. 2020.

[3] Gamage et al.: "GI-Net: Anomalies Classification in Gastrointestinal Tract through Endoscopic Imagery with Deep Learning", 2019 Moratuwa Engineering Research Conference (MERCON), IEEE, 3 Jul. 2019.

The invention claimed is:

1. A computer-implemented method capable of automatically detecting and differentiating pancreatic cystic lesions in endoscopic ultrasonography image/videos by classifying the pixels as cystic lesions, both mucinous and serous, comprising selecting an architecture combination and fully training such architecture for predicting cystic lesions with means of output validation and storage capabilities, wherein the method:

selects a number of subsets of all endoscopic ultrasonography images/videos, each of said subsets considering only images from the same patient;

selects another subset as validation set, wherein the subset does not overlap chosen images on the previously selected subsets;

pre-training (8000) each of the chosen subsets with one of a plurality of combinations of image feature extraction components, followed by a subsequent classification neural network component for pixel classification as cystic lesions wherein said pre-training;

early stops when scores of each of the chosen subsets do not improve over a given number of epochs, namely three;

evaluates the performance of each of the combinations;

is repeated on new, different subsets, with another combination of networks and training hyperparameters, wherein such new combination considers a higher number of dense layers if an f1-metric is low and fewer dense layers if the f1-metric suggests overfitting;

selects (400) the architecture combination that performs best during pre-training;

fully trains and validates during training (9000) the selected architecture combination using the entire set of endoscopic ultrasound images to obtain an optimized architecture combination;

predicts (6000) cystic lesions using said optimized architecture combination for classification;

receives the classification output (270) of the prediction (6000) by an output collect module with means of communication to a third-party capable of performing validation by interpreting the accuracy of the classification output and of correcting a wrong prediction, wherein the third-party comprises at least one of: another neural network, any other computational system adapted to perform the validation task or, optionally, a physician expert in endoscopic ultrasound imagery;

stores the corrected prediction into the storage component.

2. The method of claim 1, wherein the classification network architecture comprises at least two blocks, each having a Dense layer followed by a Dropout layer.

3. The method of claim 1, wherein the last block of the classification component includes a BatchNormalization layer followed by a Dense layer where the depth size is equal to the number of lesions type one desires to classify.

4. The method of claim 1, wherein the set of pre-trained neural networks is the best performing among the following: VGG16, Inception V3, Xception, EfficientNetB5, EfficientNetB7, Resnet50 and Resnet125.

5. The method of claim 1, wherein the best performing combination is chosen based on the overall accuracy and on the f1-metrics.

6. The method of claim 1, wherein the training of the best performing combination comprises two to four dense layers in sequence, starting with 4096 and decreasing in half up to 512.

7. The method of claim 1, wherein between the final two layers of the best performing combination there is a dropout layer of 0.1 drop rate.

8. The method of claim 1, wherein the training of the samples includes a ratio of training-to-validation of 10%-90%.

9. The method of claim 1, wherein the third-party validation is done by user-input.

10. The method of claim 1, wherein the training dataset includes images in the storage component that were predicted sequentially performing the steps of such method.

11. A portable endoscopic device comprising instructions which, when executed by a processor, cause the computer to carry out the steps of the method of claim 1.

12. The method of claim 2, wherein the last block of the classification component includes a BatchNormalization layer followed by a Dense layer where the depth size is equal to the number of lesions type one desires to classify.

13. The method of claim 4, wherein the best performing combination is chosen based on the overall accuracy and on the f1-metrics.

14. The method of claim 4, wherein the training of the best performing combination comprises two to four dense layers in sequence, starting with 4096 and decreasing in half up to 512.

15. The method of claim 4, wherein between the final two layers of the best performing combination there is a dropout layer of 0.1 drop rate.

16. The method of claim 6, wherein between the final two layers of the best performing combination there is a dropout layer of 0.1 drop rate.

17. The method of claim 9, wherein the training dataset includes images in the storage component that were predicted sequentially performing the steps of such method.

18. A portable endoscopic device comprising instructions which, when executed by a processor, cause the computer to carry out the steps of the method of claim 2.

19. A portable endoscopic device comprising instructions which, when executed by a processor, cause the computer to carry out the steps of the method of claim 3.

20. A portable endoscopic device comprising instructions which, when executed by a processor, cause the computer to carry out the steps of the method of claim 4.

21. A portable endoscopic device comprising instructions which, when executed by a processor, cause the computer to carry out the steps of the method of claim 5.

22. A portable endoscopic device comprising instructions which, when executed by a processor, cause the computer to carry out the steps of the method of claim 6.

23. A portable endoscopic device comprising instructions which, when executed by a processor, cause the computer to carry out the steps of the method of claim 7.

24. A portable endoscopic device comprising instructions which, when executed by a processor, cause the computer to carry out the steps of the method of claim 8.

25. A portable endoscopic device comprising instructions which, when executed by a processor, cause the computer to carry out the steps of the method of claim 9.

26. A portable endoscopic device comprising instructions which, when executed by a processor, cause the computer to carry out the steps of the method of claim 10.

* * * * *